United States Patent
Frühauf et al.

(10) Patent No.: US 6,823,685 B2
(45) Date of Patent: Nov. 30, 2004

(54) VEHICLE AIR CONDITIONING DEVICE

(75) Inventors: Frank Frühauf, Aichwald (DE); Dieter Heinle, Plüderhausen (DE); Jürgen Maue, Wielheim/Teck (DE); André Strobel, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/089,234

(22) PCT Filed: Jul. 11, 2001

(86) PCT No.: PCT/EP01/08025

§ 371 (c)(1),
(2), (4) Date: Aug. 14, 2002

(87) PCT Pub. No.: WO02/09961

PCT Pub. Date: Feb. 7, 2002

(65) Prior Publication Data

US 2003/0056527 A1 Mar. 27, 2003

(30) Foreign Application Priority Data

Jul. 29, 2000 (DE) ........................ 100 37 066

(51) Int. Cl.⁷ ............................................. F25D 17/00
(52) U.S. Cl. .......................... 62/178; 62/186; 236/49.3; 165/203; 454/258
(58) Field of Search .......................... 62/178, 179, 180, 62/186; 236/49.1, 49.3; 454/370, 258; 165/203, 204, 205

(56) References Cited

U.S. PATENT DOCUMENTS

| | | | |
|---|---|---|---|
| 5,230,467 A | | 7/1993 | Kubsch et al. |
| 5,518,065 A | * | 5/1996 | Asou et al. ................... 165/43 |
| 5,603,226 A | * | 2/1997 | Ishikawa et al. .............. 62/182 |
| 5,860,593 A | * | 1/1999 | Heinle et al. .............. 236/91 C |
| 5,873,520 A | * | 2/1999 | Ratgeber et al. .............. 236/94 |
| 6,454,178 B1 | * | 9/2002 | Fusco et al. ................ 236/49.3 |
| 2002/0000314 A1 | * | 1/2002 | Danieau ..................... 165/203 |
| 2002/0125334 A1 | * | 9/2002 | Remond et al. .......... 236/91 C |

FOREIGN PATENT DOCUMENTS

| | | |
|---|---|---|
| EP | 0 908 340 A2 | 4/1999 |
| EP | 0 908 340 A3 | 6/2000 |
| GB | 2 339 560 | 2/2000 |

* cited by examiner

*Primary Examiner*—Marc Norman
(74) *Attorney, Agent, or Firm*—Crowell & Moring LLP

(57) ABSTRACT

A vehicle air-conditioning device having at least one control element which supplies a prescribed value to the air-conditioning control unit, a state of flow being provided by an air speed and a degree of turbulence of the air, which can be influenced by the strength of the fan, distribution of air to the discharge nozzles, the discharge direction to the discharge nozzles and further actuators which have an effect on the state of flow, and a thermal state is provided by the temperature distribution and effect of radiation in the vehicle interior. Provision is made for the at least one control panel to be used to prescribed a state of flow desirable for the occupant and a thermal state.

10 Claims, 3 Drawing Sheets

| Type of load/ conditioning situation | Thermal control element setting | Draught sensitivity setting | Air outlet temperature | Strength of fan | Active dischargers | Discharge direction |
|---|---|---|---|---|---|---|
| Overheating summer | + | . | low | Max. | Face-Level | Face |
| | + | o | low | Max. | Face-Level | Head diffuse |
| | + | + | low | average | All diffuse | Past head |
| | o | - | Min. | Max. | Face-Level | Face |
| | o | o | Min. | Max. | Face-Level | Head diffuse |
| | o | + | Min. | average | All diffuse | Past head |
| | . | - | Min. | Max. | Face-Level | Face |
| | . | o | Min. | Max. | Face-Level | Head diffuse |
| | . | + | Min. | average | All diffuse | Past head |
| Stationary summer | + | - | average | Max. | Face-Level | Face |
| | + | o | average | average | Face-Level/Defrost | past |
| | + | + | average | low | all over | past |
| | o | - | low | Max. | Face-Level | Face |
| | o | o | low | low | Face-Level/Defrost | past |
| | o | + | low | Min. | all over | past |
| | . | - | Min. | Max. | Face-Level | Face |
| | . | o | Min. | low | Face-Level/Defrost | past |
| | . | + | Min. | Min. | all over | past |
| Stationary transitional | o | - | average | Max. | Face-Level | Face |
| | o | o | average | low | all over | past |
| | o | + | average | Min. | all over | past |
| Stationary winter | + | + | high | Min. | all over | Side window |
| Undercooling winter | o | . | Max. | Max. | all over | Face/side window |
| | o | o | Max. | Max. | all over | Side window |
| | o | + | Max. | low | Foot | past |

Fig. 4

| Type of load/ conditioning situation | Thermal control element setting | Draught sensitivity setting | Air outlet temperature | Strength of fan | Active dischargers | Discharge direction |
|---|---|---|---|---|---|---|
| Overheating summer | + | - | low | Max. | Face-Level | Face |
| | + | o | low | Max. | Face-Level | Head diffuse |
| | + | + | low | average | All diffuse | Past head |
| | o | - | Min. | Max. | Face-Level | Face |
| | o | o | Min. | Max. | Face-Level | Head diffuse |
| | o | + | Min. | average | All diffuse | Past head |
| | - | - | Min. | Max. | Face-Level | Face |
| | - | o | Min. | Max. | Face-Level | Head diffuse |
| | - | + | Min. | average | All diffuse | Past head |
| Stationary summer | + | - | average | Max. | Face-Level | Face |
| | + | o | average | average | Face-Level/ Defrost | past |
| | + | + | average | low | all over | past |
| | o | - | low | Max. | Face-Level | Face |
| | o | o | low | low | Face-Level/ Defrost | past |
| | o | + | low | Min. | all over | past |
| | - | - | Min. | Max. | Face-Level | Face |
| | - | o | Min. | low | Face-Level/ Defrost | past |
| | - | + | Min. | Min. | all over | past |
| Stationary transitional | o | - | average | Max. | Face-Level | Face |
| | o | o | average | low | all over | past |
| | o | + | average | Min. | all over | past |
| Stationary winter | + | + | high | Min. | all over | Side window |
| Undercooling winter | o | - | Max. | Max. | all over | Face/side window |
| | o | o | Max. | Max. | all over | Side window |
| | o | + | Max. | low | Foot | past |

VEHICLE AIR CONDITIONING DEVICE

BACKGROUND AND SUMMARY OF THE INVENTION

This application claims the priority of German Application No. 100 37 066.7, filed Jul. 20, 2002 and PCT International Application No. PCT/EP01/08025, filed Jul. 11, 2001, the disclosures of which are expressly incorporated by reference herein.

The invention relates to a vehicle air-conditioning device.

Vehicle air-conditioning devices are controlled by the driver via a control unit having a plurality of control elements. It is frequently possible to set both an automatic operating state and various individual, manually selectable operating states. In the automatic operating state, the air distribution is set by a program which is stored in a microprocessor and generally also takes into account external influences, in addition to the selected interior temperature. With the individually selectable operating states it is possible for the driver to match the supply of air to his specific wishes and requirements. For this purpose, a plurality of selection possibilities for the air distribution are prescribed, in conjunction with special fan settings, if appropriate. In order to set individual components, for example the fan, a control element can be provided for each component. This control element supplies a prescribed value as the manipulated value for the component. The air-conditioning device regulates the components automatically in accordance with the conditions which the individual sensors prescribe. If the user of the vehicle does not find the automatic mode which has been set to be pleasant, he can intervene in the automatic mode via the control elements.

It is a disadvantage of this type of air-conditioning device that it contains all of the control elements of a known air-conditioning device, which elements in each case individually regulate one unit. If the user finds the fan to be too strong, he will turn down the fan regulator control element. This deactivates the automatic mode for the fan. However, since different users also have different desires concerning the strength of the air flow, this may lead to a permanent deactivation of the automatic function. The other components retain their automatic setting, so that only little air mass flow passes into the vehicle and the required heating up or cooling takes longer as a result. In order to speed up the heating up or cooling again, the other components may have to be set differently. For this purpose, the operator has to re-set the corresponding control element for the heating or cooling. The various control elements are confusing, since they each regulate the individual components. The operator requires a large number of control interventions in order to set the air-conditioning device for his requirements. Only after a phase of familiarization are fewer control interventions necessary.

The object of the present invention is to simplify the control of an air-conditioning device and to better accommodate the air-conditioning device to the requirements of the user.

This is a substantial advantage of refinements according to the present invention that a provided control element supplies a prescribed value for the selection of an automatic program. This control element describes a value which is clear for the operator. Thus, for example, the draught sensitivity can be set at the control element. If the user specifies a strong draught sensitivity, an automatic program is selected via the prescribed value, which program reduces the fan and ore strongly drives the heating or cooling unit, for example. This automatic program then prescribes an optimum setting of all of the components. This automatic setting of all of the units is advantageous particularly in the case of vehicles having actuating nozzle adjustment, since the nozzles are automatically adjusted by the selected automatic programme in such a manner that, for example the draught load on the occupant is as small as possible without too severely obstructing the removal of heat from the cabin. The fan strength is therefore retained and the air is guided past the occupant. With this nozzle, which can be adjusted with regard to air quantity and blow-out direction, the control interventions can even be omitted or at least severely minimized.

BRIEF DESCRIPTION OF THE DRAWINGS

The invention will be explained in greater detail with reference to an exemplary embodiment in conjunction with a description of the figures. In the drawings FIG. 4 shows a possible characteristic diagram for the setting of the manipulated variables.

DETAILED DESCRIPTION OF THE PREFERRED EMBODIMENTS

Figure 1:
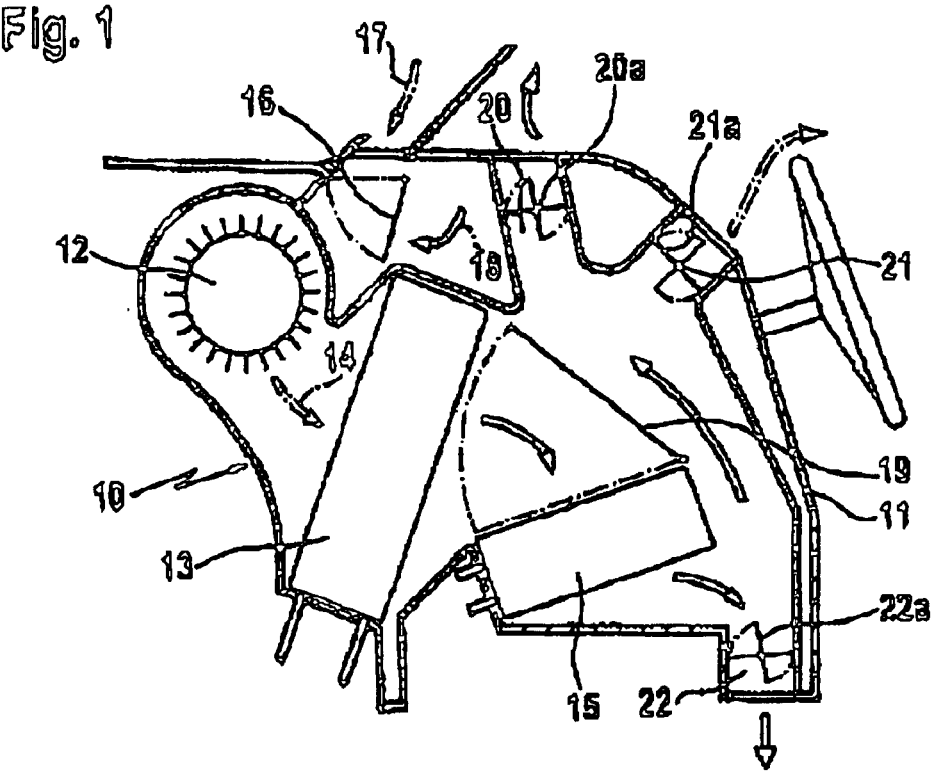
FIG. 1 shows an air-conditioning device.
Figure 2:
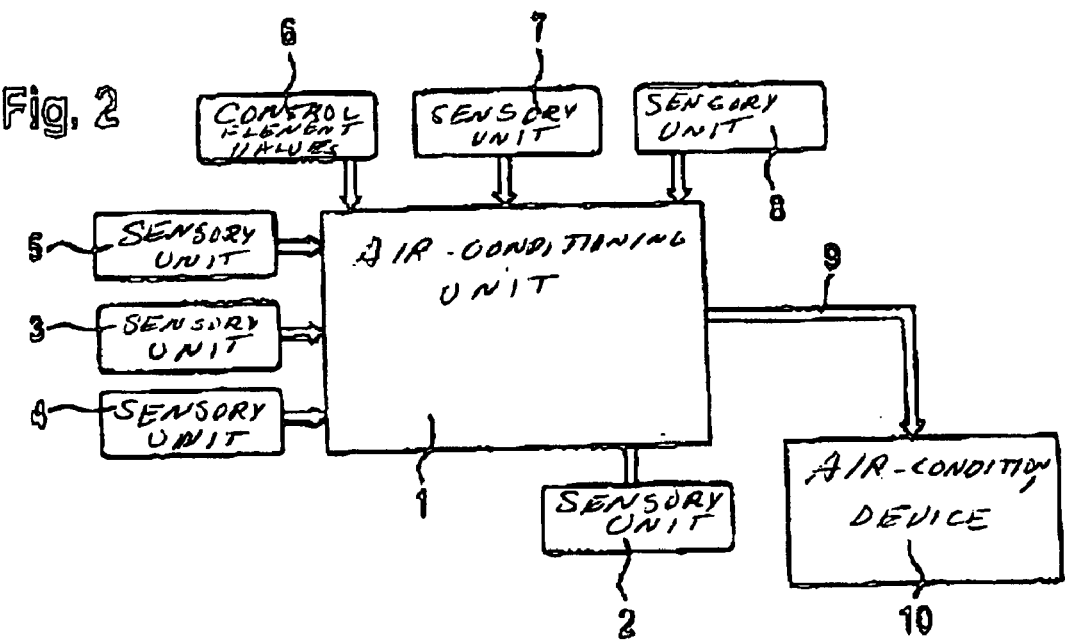
FIG. 2 shows a schematic illustration of an air-conditioning control unit.

FIG. 1 shows an air-conditioning device 10 for vehicles. The air-conditioning device 10 is situated below the dashboard 11 and contains an air intake fan 12 driven by an electric motor, a refrigerant evaporator 13 for cooling and/or dehumidifying the air flow 14 taken in by the fan, a heating heat exchanger 15 which is connected downstream, a recirculating-air flap 16 for controlling the optional intake of fresh air 17 or recirculating air 18, an air-mixing flap 19 for controlling the mixture ratio of air heated by the heating heat exchanger 15 to air which is not heated and is guided past the heated heat exchanger, and a plurality of air-conditioning air ducts, specifically a defroster air duct 20, a ventilating air duct 21, a foot well air duct 22 and a rear-compartment air duct (not shown). Each air duct 20, 21, 22 has at least one associated air flap 20a, 21a, 22a. These air flaps 20a, 21a, 22a and the recirculating-air flap 16 and the air-mixing flap 19 are actuated via actuators (not shown) which are activated by the air-conditioning control unit 1, by means of the control signals 9, as shown in FIG. 2. The air-conditioning control unit 1 uses the control signals 9 to also control the remaining components of the air-conditioning device so as to obtain the automatic control of the air conditioning. The speed of the air intake fan 12 and the air-mixing flap 19 are automatically regulated in such a manner that the air temperature in the vehicle interior reaches the prescribed desired value as quickly as possible and then remains constant. The air-conditioning air ducts 20, 21, 22 each have one or more outlet openings at which a respective discharge nozzle is arranged. The air-conditioning control unit 1 processes the output signals of the above-specified sensory units 2 to 5, 7, 8 and the two prescribed values 6 of the two control elements from FIG. 3 and, as a function thereof, generates the appropriate control signals 9 for the automatic activation of the components of the air-conditioning device 10. This includes the control of the positions of the vehicle openings, such as the sliding roof and, window openings, as well as control of the speed of the air-intake fan 12, and also the positions of the recirculating-air flap 16, the air-mixing flap 19 and of the air flaps 20a, 21a, 22a in the various air-conditioning ducts 20 to 22, and in particular also of the positions of the various air-guiding grates of the discharge nozzles in order to carry out the conditioning and distribution of the air to be supplied to the vehicle interior in a manner which is correct for the situation. In order to set the discharge direction with a manual adjustment by the control element 31 of the air-guiding grates of one discharge nozzle, the adjustment of the air-guiding grates of the other discharge nozzle takes place in a connected manner. In the case of a prescription which characterizes the driver as draught-insensitive, the discharge directions of the left side nozzle and of the central nozzle on the left are directed directly at the driver. When prescribing the manipulated variables 9 of the vehicle air-conditioning device 10, in addition to the prescribed values 6, the state of the vehicle at the starting up of the vehicle, and the pre-conditioning of the vehicle, is also taken into consideration.

Figure 3:
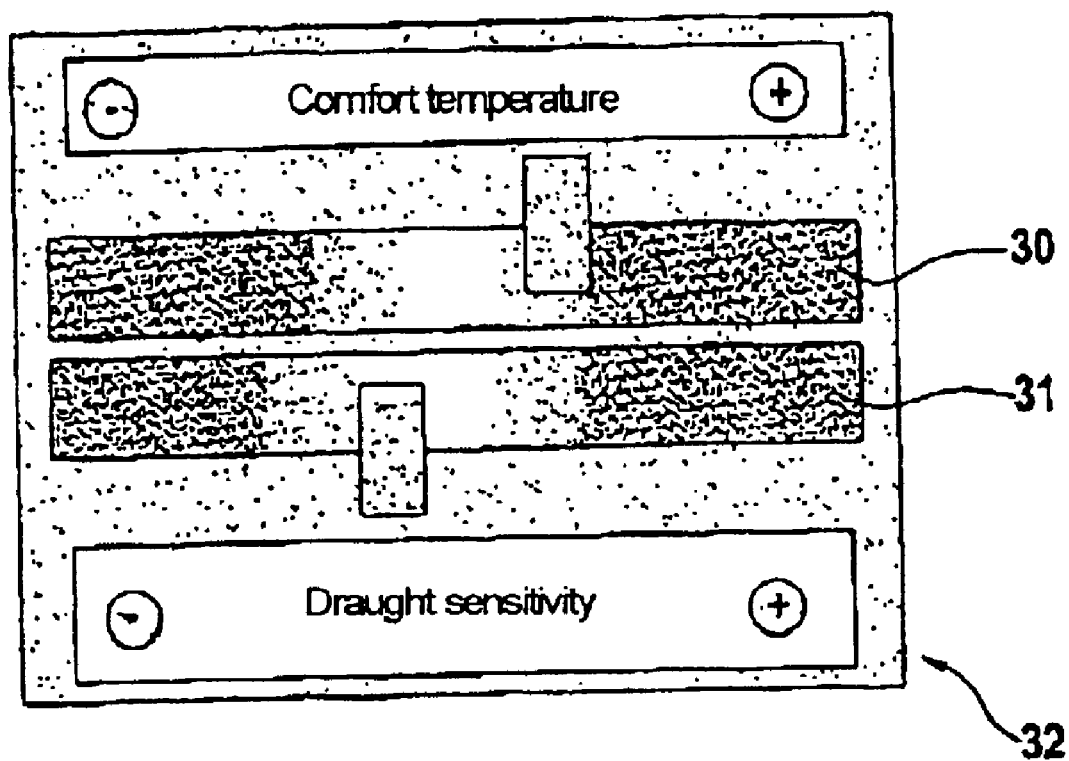
FIG. 3 shows two control elements.

FIG. 3 shows a control panel 32 for the air-conditioning device 10 having two control elements 30, 31 which are designed here by way of example as sliding regulators. Each control element 30, 31 supplies a prescribed value for the air-conditioning control unit 1. The user can input his desired comfort temperature at the upper control element 30. If he wishes it to be somewhat warmer, he slides the sliding regulator to the right to +, and if he wants it to be somewhat cooler, he slides the regulator to the left to −. The draught sensitivity can be set at the lower control element 31. In the case of low draught sensitivity, the user will slide the sliding regulator to the right, in the case of high draught sensitivity, he will slide the sliding regulator to the left. As described in FIG. 1, the two control elements 30, 31 each supply a prescribed value for the setting of the manipulated variable 9 of the air-conditioning device 10. The air-conditioning control unit 1 selects an automatic mode as a function of these two prescribed values and determines the setting of all of the manipulated variables 9 of the air-conditioning device 10. The operator then recognises a setting which is optimum for him and may deviate from the basic setting of the vehicle. He will generally retain this setting which is optimum for him and will re-set it again after adjustment by another user.

In the case of a multi-zone air-conditioning system, separate control panels are provided for each zone. In order to satisfy the user's wishes even better, a number of control panels can be provided for different body regions, or a selection function having a storage function can be provided on a control panel. The user can use this selection function firstly to select the body region for which the control panel 32 is used. The user can then prescribe the setting for the selected body region on the control panel.

In addition, a display device can be provided for the control characteristics of the system includes the components of the air-conditioning system, the air ducts, the interior and the occupants. For example, with an LED which displays green if the system including the components of the air-conditioning system, the air ducts, the interior and the occupant can be controlled, and displays red if the system can not be controlled. This warns the user if the prescribed values for comfort temperature and draught sensitivity cannot be achieved in this combination in the conditioning situation at the particular moment (red colour). The user can therefore decide himself whether the setting for the comfort temperature or the draught sensitivity is more important to him by, for example, changing one of the two control elements until the LED displays green again.

FIG. 4 shows a possible characteristic diagram for the setting of the manipulated variables 9 of the air-conditioning device 10. This characteristic diagram determines the settings of the manipulated variables as a function of the prescribed values of the control elements. Comfort temperature (thermal control element) and draught sensitivity (draught control element) can be set via the control elements as prescribed values. As an example, the three values +(strong), 0(normal) and −(light) have been selected. Intermediate values can also be set. In addition, five conditioning situations have been selected. A conditioning situation is determined via the values of all of the sensors installed for this purpose in the vehicle including, for example, the inside and outside temperature sensor or the sun sensor. The air outlet temperature, the strength of the fan, the air distribution to the nozzles and the discharge direction at the nozzles (active dischargers) are then set in accordance with the conditioning situation and the setting of the two control elements—the comfort temperature and draught sensitivity.

The first case illustrated in the table of FIG. 4 is taken as an example;

| | | |
|---|---|---|
| Conditioning situation: | Overheating summer | |
| Comfort temperature: | + | Control element |
| Draught sensitivity: | − (insensitive) | setting |
| Air outlet temperature: | low | |
| Strength of the fan: | max | Resulting |
| Active dischargers: | Face level | automatic |
| Discharge direction: | Face | setting |

Overheating summer is defined, for example, by a high inside temperature and a high outside temperature. However, other sensor values are likewise used for the determination of the conditioning situation. The user sets the comfort temperature and his draught sensitivity, which is generally characteristic for each user irrespective of the particular conditioning situation, at the control element. The user selected in the example feels comfortable at a comfort temperature above average (+) and is not draught-sensitive (−). The air outlet temperature is therefore only low and is not at the minimum value, and the strength of the fan is high. Since the user is not draught-sensitive, the dischargers in the face region are supplied with air and the discharge direction is aimed directly at the face. If, in contrast, the occupant were draught-sensitive (+) in the same situation, then the nozzles would be set, also at a high fan power, in such a manner that the air brushes past the head, but the excess heat is nevertheless transported with a high air throughput and a lower air temperature out of the interior. Further cases according to which the manipulated variables are set are recorded in the other lines of the table.

What is claimed is:

1. A vehicle air-conditioning device comprising:
   at least one control element supplying a prescribed value to an air-conditioning control unit;
   a fan including outlet nozzles and actuators wherein a state of air flow is determined by air speed and location of air movement based on the output of said fan and wherein said state of air flow is further influenced by the distribution of air to said outlet nozzles, an outlet direction of the outlet nozzles and said actuators and wherein a thermal state of a vehicle is provided by the distribution of temperature and radiation effect in an interior of said vehicle; and wherein said at least one control element prescribes a determined state of flow and a determined thermal state for an occupant of said vehicle wherein said determined state of flow provides draught-sensitivity ranging from very draught-sensitive to not draught-sensitive.

2. The vehicle air-conditioning device according to claim 1, further comprising multi-zone air-conditioning system separate control panels with one of said panels being provided for each of a respective zone of said multi-zone system.

3. The vehicle air-conditioning device according to claim 1, further including a plurality of control panels provided for settings for different body regions of said occupant.

4. The vehicle air-conditioning device according to claim 1, including a control panel having said at least one control element and a selection device for storing and selecting settings for the different body regions of said occupants.

5. The vehicle air-conditioning device according to claim 1, further including a display means for displaying control characteristics of the device including the control characteristics of components of the air conditioning device, the air ducts, the interior and occupants.

6. A vehicle air-conditioning device comprising:

at least one control element supplying a prescribed value to an air-conditioning control unit;

a fan including outlet nozzles and actuators wherein a state of air flow is determined by air speed and location of air movement based on the output of said fan and wherein said state of air flow is further influenced by the distribution of air to said outlet nozzles, an outlet direction of the outlet nozzles and said actuators and wherein a thermal state of a vehicle is provided by the distribution of temperature and radiation effect in an interior of said vehicle; and wherein said at least one control element prescribes a determined state of flow and a determined thermal state for an occupant of said vehicle and;

two control elements which prescribe the state of flow by draught-sensitivity and the thermal state by comfort temperature with at least one automatic mode being selected in accordance with both determined values of said two control elements.

7. A vehicle air-conditioning device comprising:

at least one control element supplying a prescribed value to an air-conditioning control unit;

a fan including outlet nozzles and actuators wherein a state of air flow is determined by air speed and location of air movement based on the output of said fan and wherein said state of air flow is further influenced by the distribution of air to said outlet nozzles, an outlet direction of the outlet nozzles and said actuators and wherein a thermal state of a vehicle is provided by the distribution of temperature and radiation effect in an interior of said vehicle; and wherein said at least one control element prescribes a determined state of flow and a determined thermal state for an occupant of said vehicle wherein distribution of the air-conditioned air to said outlet nozzle and the air-conditioning outlet is set by the determined values of comfort temperature and draught-sensitivity.

8. A vehicle air-conditioning device comprising:

at least one control element supplying a prescribed value to an air-conditioning control unit;

a fan including outlet nozzles and actuators wherein a state of air flow is determined by air speed and location of air movement based on the output of said fan and wherein said state of air flow is further influenced by the distribution of air to said outlet nozzles, an outlet direction of the outlet nozzles and said actuators and wherein a thermal state of a vehicle is provided by the distribution of temperature and radiation effect in an interior of said vehicle; and wherein said at least one control element prescribes a determined state of flow and a determined thermal state for an occupant of said vehicle wherein, in order to set a discharged direction with a manual adjustment of air-guiding plates of one of said discharge nozzles, adjustments of air-guiding plates of other ones of said discharge nozzles takes place in a connected manner.

9. A vehicle air-conditioning device comprising:

at least one control element supplying a prescribed value to an air-conditioning control unit;

a fan including outlet nozzles and actuators wherein a state of air flow is determined by air speed and location of air movement based on the output of said fan and wherein said state of air flow is further influenced by the distribution of air to said outlet nozzles, an outlet direction of the outlet nozzles and said actuators and wherein a thermal state of a vehicle is provided by the distribution of temperature and radiation effect in an interior of said vehicle; and wherein said at least one control element prescribes a determined state of flow and a determined thermal state for an occupant of said vehicle wherein the determined values of the comfort temperature and draught-sensitivity prescribe manipulated variables for openings of said vehicle.

10. The vehicle air-conditioning device according to claim 9, wherein the prescribed manipulated variable are a function of pre-conditioning of the vehicle startup of the vehicle and the determined values of comfort temperature and draught-sensitivity.

* * * * *